Dec. 12, 1961  M. T. McCALL  3,012,461
APPARATUS FOR PRODUCING VISUAL EFFECTS
Filed Nov. 8, 1956  3 Sheets-Sheet 1
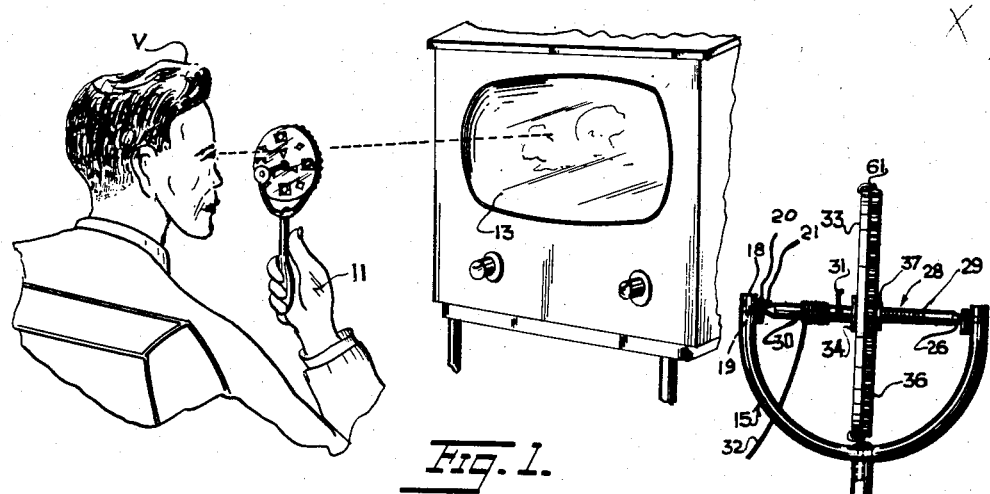
Fig. 1.
Fig. 2.
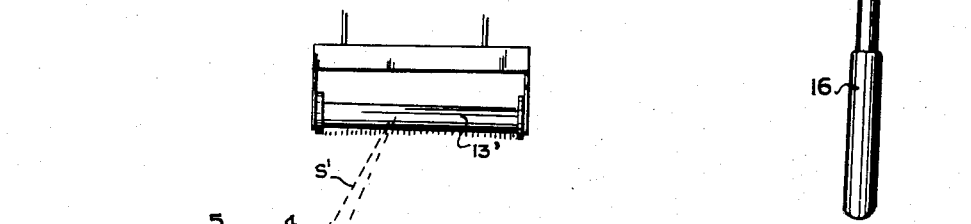
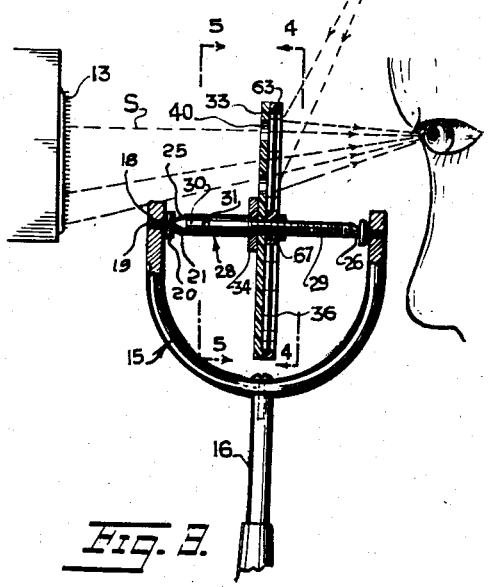
Fig. 3.
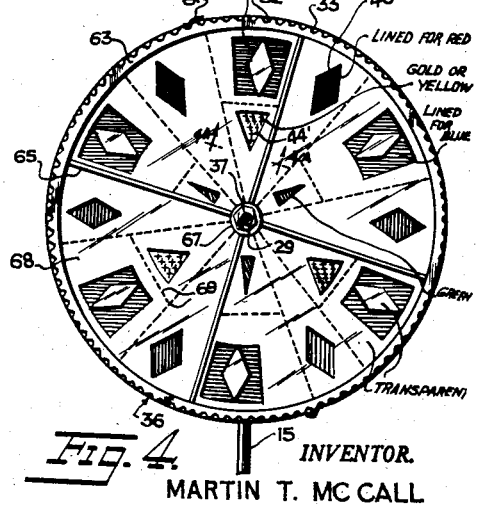
Fig. 4.
Fig. 4A.
INVENTOR.
MARTIN T. McCALL
BY
ATTORNEY Dec. 12, 1961    M. T. McCALL    3,012,461
APPARATUS FOR PRODUCING VISUAL EFFECTS
Filed Nov. 8, 1956    3 Sheets-Sheet 2
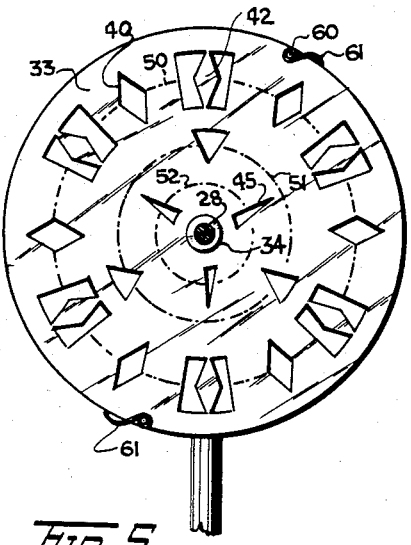
Fig. 5.
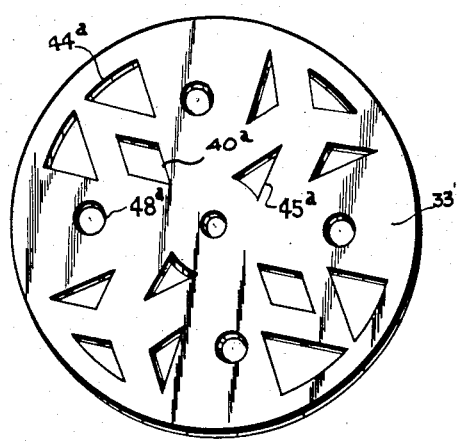
Fig. 10.
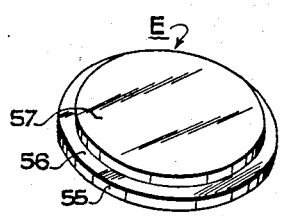
Fig. 6.
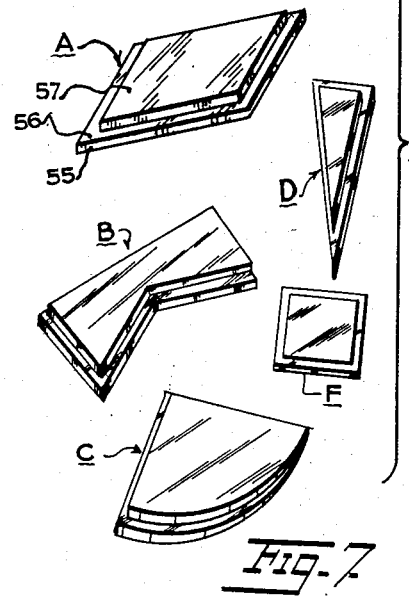
Fig. 7.
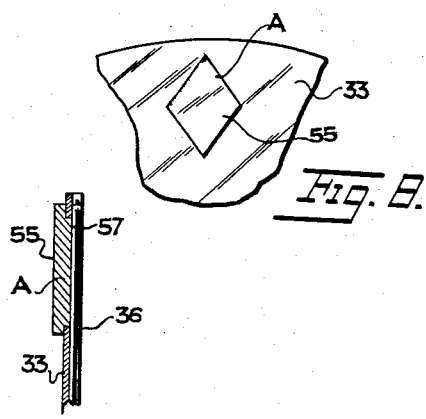
Fig. 8.
Fig. 9.
INVENTOR.
MARTIN T. McCALL
BY
ATTORNEY

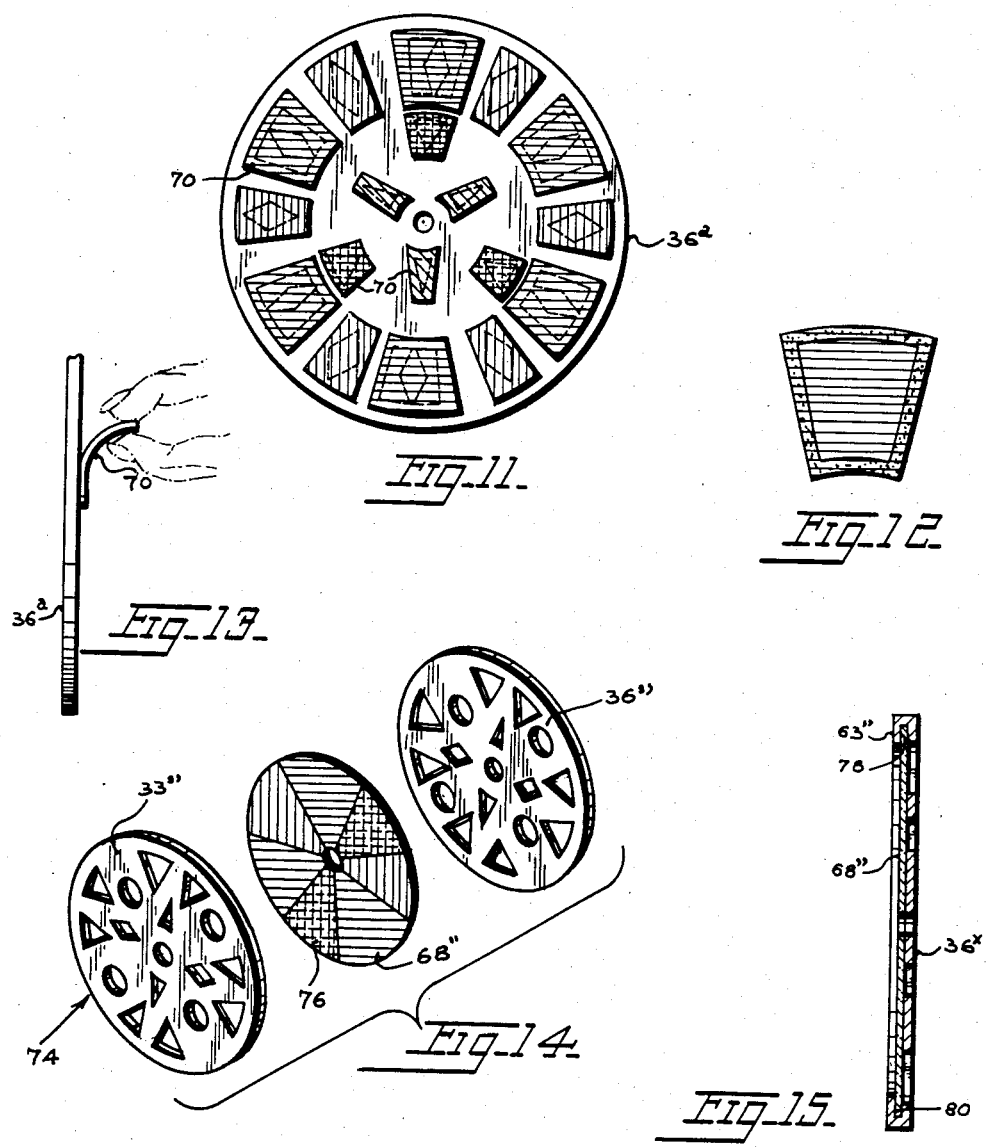

United States Patent Office 3,012,461
Patented Dec. 12, 1961

---

3,012,461
APPARATUS FOR PRODUCING VISUAL EFFECTS
Martin T. McCall, 10 Argyle Road, Brooklyn, N.Y.
Filed Nov. 8, 1956, Ser. No. 621,040
2 Claims. (Cl. 88—1)

This invention relates to an apparatus for producing visual effects and, more particularly, to such devices having means for selectively adjusting and changing the optical pictures to produce different visible patterns.

In a conventional kaleidoscope a plurality of optical elements of various shapes and sizes are disposed in random array. The array changes as the kaleidoscope is rotated or shaken. With each change in array a differently colored or differently shaped pattern appears. Generally the operator of the device has no control over the precise arrangement of the array of optical elements and thus the resulting visible pattern is not controllable.

It is a principal object of the present invention to provide an apparatus for producing visual effects in which the several optical elements are selectively variable as to size, shape, transparency, color, etc.

It is a further object to provide an apparatus for producing visual effects which may be used in connection with one or more flashing light sources to produce interesting varying optical patterns.

It is a further object to provide an apparatus for producing visual effects including a rotatable disk having a plurality of apertures which may be selectively filled or covered with opaque, transparent, translucent, luminescent, or colored elements.

It is a further object to provide an apparatus for producing visual effects which can be viewed simultaneously by transmitted and reflected light emitted by light sources respectively flashing at the same or different frequencies.

It is a further object to provide an apparatus for producing visual effects having a rotatable member including two disks selectively adjustable with respect to each other by a detent means, one or both of said disks being provided with means for selectively inserting or removing opaque and transparent elements to vary the optical arrangement of the disks.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of one form of apparatus embodying the invention, and shown in operating use by an observer viewing the device in connection with a television screen.

FIG. 2 is an end view of the apparatus shown in FIG. 1.

FIG. 3 is another end view of the apparatus with portions thereof shown in section, the device being shown in operating use in connection with two light sources.

FIGS. 4 and 5 are side views of the device taken on lines 4—4 and 5—5, respectively, of FIG. 3.

FIG. 4A is a fragmentary sectional view taken on lines 4A—4A of FIG. 4.

FIG. 6 is an elevational view on an enlarged scale of a portion of the device as shown in FIG. 4.

FIG. 7 shows perspective views of a plurality of optical elements usable in the device.

FIG. 8 is an elevational view of a portion of the device including one of the optical elements shown in FIG. 7.

FIG. 9 is a sectional view taken through the center of FIG. 8.

FIG. 10 is a perspective view of an alternative form of optical disc which may be employed in the device.

FIG. 11 is a side elevational view of another modified form of optical disk.

FIG. 12 is a plan view of the rear side of one of the colored window pieces shown on the optical disk of FIG. 11.

FIG. 13 is an edge view of the optical disk showing the manner of mounting a colored window piece.

FIG. 14 is a spread perspective view of a modified form of optical disk assembly.

FIG. 15 is an edge view of another modified form of optical disk.

In FIG. 1 is shown an apparatus 10 embodying the invention disposed in operative association with an observer V who is using the device in connection with a television receiver tube 13 that provides a flashing source of light with which the apparatus is adapted for use. Referring to FIGS. 2–5, the device is more clearly shown to include a frame comprising a U-shaped yoke 15 and a handle 16 disposed in coplanar relationship therewith and attached to the midsection of the yoke by means of a screw 17. The yoke and handle may be made of plastic material. At its free ends, the yoke is formed with internally threaded openings 18 extending thereacross to receive the threaded shanks 19 of T-shaped bearings 20. Each bearing 20 is formed with a central socket opening 21. A shaft 28 is disposed between the ends of the yoke and has its tapered ends 25 and 26 journalled in the openings 21.

The shaft has a threaded section 29 and a smooth section 30 of larger diameter and provided with an aperture 31 for removably receiving one end of a length of flexible cord or string 32. A circular disk 33 is disposed on shaft 28 and is held in abutment with a washer 34 juxtaposed to the shoulder formed between smooth section 30 and the threaded section 29. Another disk 36 is disposed on shaft 28 and is held in juxtaposition with disk 33 by a nut 37 threaded on section 29.

Disk 33, as more clearly shown in FIG. 5, is a thin, rigid, circular opaque plate of metal, plastic or other suitable material. The disk is provided with one or more rows of spaced openings having various geometrical shapes. The openings are spaced equidistantly and circumferentially around the disc on concentric circles. One or more circular rows of openings may be used. The openings should be symmetrical in shape and centered in relation to radial lines originating at the center of the disk. The shapes of the openings in the several rows may be the same or may vary. Thus the openings may be circular, triangular, square, diamond, etc.

In FIG. 5 the outer ring 50 includes a series of diamond-shaped openings 40 shown disposed in alternation with generally trapezoidal openings 41 enclosing diamond-shaped plate portions 42. In an intermediate circular ring 51 is a plurality of openings formed as circular segments 44. These openings are disposed 120° apart. A plurality of triangular openings 45 are arranged 120° apart on the innermost ring 52.

In FIG. 7 are shown a plurality of optical elements A—F having various shapes which may be inserted into the several openings in disk 33. These elements may be formed of colored opaque material or of colored transparent material such as of plastic or glass. If desired these elements may have phosphorescent surfaces which glow when light impinges upon them. The opaque elements may be formed of heavy material such as iron or lead for a purpose to be described. These heavy elements may be coated with white or aluminum paint or be given a mirror surfacing. Element A is shown diamond-shaped to fit into an opening 40. Element B is shaped to fit into opening 41. Elements C and D are shaped to fit into the segment and triangular openings 44, 45, respectively. Circular and square elements E and F are provided to fit into circular and square openings respectively. Each element has a base portion 55 formed with a ledge or seat 56 to define an upper smaller portion 57. The smaller portion fits snugly into the appropriate correspondingly shaped opening in disk 33 with the face of portion 57 flush with the surface of disk 33.

A pair of pins 60 are disposed in diametrically opposite positions near the edge of disk 33. These pins hold leaf springs 61 which are bent over the edge of the disk and have their free ends pressed into the scalloped recesses or serrations 62 in the periphery of a rim 63 on disk 36, as best shown in FIG. 6.

Disk 36 is best shown in FIGS. 4 and 4A and has its circular outer rim 63 formed of an opaque rigid material. The outer edge of the rim has the serrations 62. In diametrically opposite serrations 62 are engaged the detent spring elements 61. The disk 36 has a plurality of radially disposed ribs 65 joining rim 63 to its hub 67. Between the ribs are secured transparent sections 68. Each section is formed of clear or colored transparent film on which are colored areas shaped and disposed to correspond with the openings in the disk 33. Diamond-shaped areas 40' are arranged to provide colored windows at the openings 40 in disk 33. Colored areas 41', 44' and 45' provide colored windows for openings 41, 44 and 45, respectively, in disk 33. The film sheets or sections 68 are scored along lines 69 in such manner that any one of the colored areas may be easily torn out of the disk 36 without affecting the remaining colored areas. These colored areas may be formed by printing the film with colored inks or by attaching preformed and shaped pieces of colored film to the locations desired on the sections 68. The colored windows may be applied as pieces of colored cellophane having pressure sensitive adhesive surfaces. These window pieces may readily be removed and replaced as desired.

Disk 36 is rotatable with respect to disk 33 on shaft 28 under control of the detent spring elements 61 so that the colored windows in disk 36 can be shifted with respect to the openings in disk 33. Disk 36 can be shifted to such an extent that the openings in disk 33 are partially or wholly clear of the colored windows in disk 36. If the background of film 68 is clear or colored then the openings in disk 33 will have their transparency changed as disk 36 is moved. When disk 36 is moved to a desired position with respect to disk 33 nut 37 may be tightened to lock the disks together.

Elements A—E shown in FIG. 7 may be placed in the several openings in disk 33 as shown in FIGS. 8 and 9, either to close an opening or to vary its optical transmission characteristics. Both the transparency and reflectance of the optical paths through the openings may be varied depending on the type of optical element inserted in the selected opening.

The raised portion 57 of each element fits snugly in the opening with the ledge 56 overlying the margin of the opening as shown in FIG. 9.

In FIG. 10 is shown another disk 33' provided with openings 40ᵃ, 44ᵃ, 45ᵃ, 48ᵃ arranged in a different pattern from that of disk 33. Disks with other symmetrical, balanced concentric arrays of openings may be provided as desired.

In operation, the device is held in the hand 11 of the operator or viewer V as shown in FIG. 1. The viewer may look through either side of the device. The disks 33 and 36 are set to their desired relative positions and secured by nut 37. One end of string 32 is inserted in hole 31 and the string is wound up on the shaft 28 as shown in FIG. 2. When the string is pulled outwardly slowly and firmly away from shaft 28 a very rapid speed of rotation is imparted to the disks. The device is then held to the eye of the viewer with the device disposed between the viewer and a flashing light source such as the television receiver tube 13, a fluorescent lamp or an incandescent lamp energized by an alternating current source of power. The light beams S pass through the array of openings as they are periodically interrupted by the opaque portions of the disk 33 and the regular periodic flashing of the light source. As the disks rotate very interesting and attractive optical effects are observed. While the light passes through the disks, the speed of rotation thereof gradually decreases.

Various changes in the observed optical pattern occurs such as blending and dissolving of the triangles, circles, squares, etc., and the superimposing of one shape of opening on the other such as circles on triangles, etc. For example, the diamond-shaped openings 40 colored by windows 40' will periodically appear and reappear overlying disc portions 42 within the differently colored windows 41. As the speed of the rotation of the disks decreases, the optical pattern changes in form and color to provide a fascinating spectacle.

If it is desired to prolong the length of time the disks rotate, it is possible to employ heavy weights having the shape of elements A—F inserted in appropriately shaped openings. The use of these weights will increase the mass of the rotating members of the device and prolong the length of time during which the spectacle is visible. If desired, disk 33 may be made of a massive material or the rim 62 of disk 36 may be made of heavy material to achieve this same flywheel effect and prolong the spectacle producing period.

FIG. 3 shows the television receiver tube 13 used as one light source and fluorescent lamp 13' used as another light source. Lamp 13' provides beams S' which are reflected from the disks 33, 36 while beams S from tube 13 pass through the disks. Generally the fluorescent lamp will be supplied with power from a sixty cycles per second source while the television receiver tube 13 will flash thirty times per second. The combination of the transmitted and reflected beams produces spectacular changing optical effects, particularly if parts of disks 33 and/or 36 are coated with phosphorescent or fluorescent material.

If the television receiver is a changing colored light source as will be the case if it is a color television tube the spectacular effects obtained will be heightened. If desired, lamp 13' may also be a colored light source. The lamp 13' may be an incandescent bulb or another television receiver tube screen. If desired, a fluorescent or incandescent lamp may be substituted for the television receiver tube 13.

A particularly valuable feature of the invention is the provision of means whereby the viewer can alter the pattern of the openings and their color in the disk 33 and also alter the pattern and arrangement of the windows in the disk 36. If desired, the disk 33' may be substituted for disk 33 or it may be used in juxtaposition therewith. If disks 33, 33' and 36 are all mounted together on shaft 28, the disks can be shifted with respect to each other to vary the pattern of openings therethrough. Disk 33' should be provided with serrations such as those shown for disk 36 and detent springs should likewise be provided to hold the selected relative positions of the juxtaposed disks 33, 33'.

In the modified form of disk 36ᵃ shown in FIG. 11, an individual colored window piece or strip 70 of plastic material is preferably pasted over each individual window 71 in the disk. The piece or strip 70 may be provided with adhesive 72 around its margin on the rear side thereof for this purpose. In FIG. 13, a strip 70 is shown being applied by hand to the surface of the disk. The strips 70 are of contrasting colors.

FIG. 14 illustrates a modified form of optical disk assembly indicated generally at 74. This assembly includes a pair of thin identical outer disks 33" and 36" and an intermediate wafer thin disk 68" of plastic material with various colored sections 76. These disks are joined together in superposed and laminated form by heat and pressure, by use of adhesive or in any other suitable manner. The assembly of disks is preferably press-fitted onto the shaft.

FIG. 15 illustrates another modified form of optical disk 36ˣ wherein the rim 63" thereof has an undercut portion 78 for clampingly receiving the peripheral edge 80 of the flexible colored disk 68 so that the colored disk may be readily removed and replaced.

If the device as disclosed herein were rotated and viewed by means of a stationary light source no significantly attractive optical patterns would be produced. The unusual and unexpected spectacular effects obtained are produced when the device is viewed by a flashing light source or sources. The changing speed of rotation of the disks plus the natural inherent retention by the retina of the viewer's eye of the changing optical display are material factors in creating the desired illusion. Certain stroboscopic effects are also important. As an example, suppose the disks are rotating at thirty revolutions per second and that the light source flashes thirty times per second. Then if the speed of rotation were constant, the viewed light source and the openings in the disks would appear to be stationary. Actually the disks rotate at a steadily decreasing speed due to friction, wind resistance, etc., so that the optical pattern does change. Now suppose that a disk 33 has a pattern consisting of square and circular openings, four of each, alternating and centered forty-five degrees apart on a circle concentric with the circular edges of the disk. When the string 32 is drawn wholly clear of the shaft, the speed of rotation of the disk gradually decreases while the rate of flashing of the light source 13 remains constant. The light passes through the array of openings in a pattern which gradually causes the blending and dissolving of the squares and circles and superimposing of the squares on the circles and vice versa. At the same time the various colors also merge and blend and displace one another in a spectacular way.

When the disks have two or more circularly arranged rows of colored windows the several circular rows will at times appear to be rotating in opposite directions. The superposition of light beams having different flashing frequencies, different colors, and different intensities heighten the spectacular effects. The use of fluorescent or phosphorescent areas on the disks which are viewed while rotating by reflected light superimposed on changing patterns of windows transmitting differently colored light is very spectacular and unusual.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. An apparatus for producing visual effects for use with a flashing light beam comprising a U-shaped yoke having bearing means at the free ends thereof, a handle secured to the yoke and disposed in coplanar relationship therewith, a shaft having a threaded portion being transversely disposed between said bearing means and rotatable therein, said shaft having an opening therein for receiving a string to rotate the shaft and a shoulder adjacent said threaded portion, a pair of disks rotatably mounted on said shaft, one of said disks being a circular opaque plate having a plurality of variously shaped openings therein disposed in a predetermined array, said openings being arranged in a plurality of concentric rows, the openings in each row being equally spaced from each other, the second of said disks having a hub and a rigid rim, said hub being joined to said rim by a series of radially arranged ribs, said rim having a serrated outer peripheral edge, each of the sectors defined by said ribs being transparent and having a series of light-pervious varied-colored portions thereon arranged in an array corresponding to the array of said openings in said one disk, a plurality of spring detent members carried by said one disk and arranged to engage serrations on the rim of said second disk, said disks being juxtaposed together on said threaded portion of said shaft, and a nut mounted on said threaded portion in engagement with said hub to hold the disks together, said second disk being rotatable with respect to said one disk under control of said detent members when said nut is loosened to vary the alignment of said array of openings in said one disk and said array of colored portions on said second disk so as to alter the patterns disclosed, whereby an optical pattern constantly changing in shape and color is produced by rotating said disks substantially transversely in said flashing light beam between said light source and said viewer.

2. An apparatus for producing visual effects for use with a flashing light beam comprising a U-shaped yoke having bearing means at the free ends thereof, a handle secured to and extending from the mid-section of the yoke and in coplanar relationship therewith, a shaft having a threaded portion transversely disposed between said bearing means and rotatable therein, said shaft having an opening therein for receiving a string to rotate the shaft, and a peripheral shoulder adjacent said threaded portion, a pair of disks mounted on said shaft, one of said disks being a circular opaque plate having a plurality of variously shaped openings therein disposed in a predetermined array, said openings being arranged in a plurality of concentric rows, the openings in each row being equally spaced from each other, the second of said disks having a hub and a rigid rim and a series of radially arranged ribs joining said hub to said rim, said rim having a serrated outer peripheral edge, each of the sectors of said disk defined by said rims being transparent and having an array of light-pervious varied-colored portions thereon, said array of colored portions on said second disk being arranged to correspond to such array of openings in said one disk, said transparent portion of said second disk being scored to facilitate removing of selected ones of said colored portions, a plurality of spring detent members carried by said one disk and arranged to engage diametrically opposite serrations on the rim of said second disk, said disks being juxtaposed together on a threaded portion of said shaft, and a nut mounted on said threaded portion in engagement with said hub to hold the disks together, said second disk being rotatable with respect to said one disk under control of said detent members when said nut is loosened to vary the alignment of said array of openings in said one disk and said array of colored portions on said second disk so as to alter the patterns disclosed, whereby an optical pattern constantly changing in shape and color is produced by rotation of said disks in said flashing light beam between the beam source and the viewer and substantially transverse thereto.

References Cited in the file of this patent

UNITED STATES PATENTS

| | | |
|---|---|---|
| 845,529 | Cunningham | Feb. 26, 1907 |
| 911,582 | Evans | Feb. 9, 1909 |
| 1,422,149 | Troeger | July 11, 1922 |
| 1,717,785 | Kaehni et al. | June 18, 1929 |
| 1,978,250 | Dilks | Oct. 23, 1934 |
| 2,000,153 | Watson | May 7, 1935 |
| 2,222,414 | Kudar | Nov. 19, 1940 |
| 2,296,019 | Camerena | Sept. 15, 1942 |
| 2,384,260 | Goldsmith | Sept. 4, 1945 |
| 2,493,238 | Eddy | Jan. 3, 1950 |
| 2,688,900 | Silverman | Sept. 14, 1954 |
| 2,763,678 | Graves | Sept. 18, 1956 |

FOREIGN PATENTS

| | | |
|---|---|---|
| 146,647 | Germany | Dec. 19, 1903 |
| 12,715 | Great Britain | of 1910 |
| 193,121 | Great Britain | Feb. 14, 1923 |
| 648,459 | France | Aug. 13, 1928 |
| 11,642 | Australia | Mar. 5, 1934 |